United States Patent
Goodman

[15] 3,646,513
[45] Feb. 29, 1972

[54] VEHICLE INTERNAL-COMBUSTION ENGINE FUEL CONTROL AND SIGNAL DEVICE

[72] Inventor: Johnny Goodman, Granite City, Ill.
[73] Assignee: Joseph J. Bristow, East Carondelet, Ill. a part interest
[22] Filed: Jan. 25, 1971
[21] Appl. No.: 109,392

[52] U.S. Cl. .................................340/53, 180/82
[51] Int. Cl. .................................B60q 1/00, G08b 21/00
[58] Field of Search ..................340/52, 53, 57; 180/82

[56] References Cited

UNITED STATES PATENTS

| | | | |
|---|---|---|---|
| 3,302,171 | 1/1967 | Sensing | 340/57 |
| 3,546,667 | 10/1968 | Thomas | 340/53 |
| 3,431,779 | 3/1969 | Wilken et al. | 340/52 X |
| 3,509,529 | 4/1970 | Utter | 340/52 |

Primary Examiner—Alvin H. Waring
Attorney—Koenig, Senniger, Powers & Leavitt

[57] ABSTRACT

A control for preventing damage to an internal-combustion engine due to extended operation at excessive temperatures where the engine speed varies according to flow of fuel thereto. The control includes a fuel-limiting solenoid valve which controls the flow of fluid to the engine and which has a plunger movable from a first position permitting unobstructed fuel flow to a second position causing fuel flow reduction to a preset reduced amount causing engine speed reduction sufficient to reduce the operating temperature thereof, the valve having a winding which, when deenergized, permits movement of the plunger from the first position to the second position. Switch means is connected in a circuit with the winding for controlling the energization thereof and is responsive to the operating temperature of the engine. This switch means operates to cause deenergization of the winding when the engine operating temperature exceeds a preset level, thereby protectively reducing the engine speed to reduce its operating temperature.

10 Claims, 4 Drawing Figures

PATENTED FEB 29 1972

Johnny Goodman,
Inventor.
Koenig, Senniger,
Powers and Leavitt,
Attorneys.

VEHICLE INTERNAL-COMBUSTION ENGINE FUEL CONTROL AND SIGNAL DEVICE

BACKGROUND OF THE INVENTION

This invention relates generally to automotive fuel controls and more particularly to a fuel control for preventing damage to an internal-combustion engine.

In the operation of trucks, such as large, long-haul truck tractors having diesel engines, there is a serious problem in the trucking industry of damage to such engines which results from extended operation at excessive temperatures. It often happens that a truck engine will be operated with greater power output and greater speed than is prudent, typically with indifference or deliberate disregard to the engine temperature. For example, the truck may be driven for long periods with wide-open throttle. In truck engines having exhaust-driven turbochargers, an increase in exhaust temperature will provide even greater available power. A driver may therefore deliberately permit the engine temperature to become excessive for the purpose of obtaining greater power. In addition to these kinds of manhandling of an engine, there is a widespread problem caused by drivers who modify the fuel controls of an engine, such as by restricting the fuel return line for a diesel engine, in order to provide greater power output and greater engine speed. In any case, extended operation of the engine at the resultant excessive temperatures produces serious damage to the engine, such as cracked pistons, broken piston rings, and the like.

Heretofore, there has been no effective means for preventing thermal damage to truck engines resulting from extended operation at excessive temperatures. Examples of the prior art may be found in U.S. Pat. Nos. 2,171,401, 2,629,047, 2,692,980, 2,870,753, and 3,431,555.

BRIEF DESCRIPTION OF THE INVENTION

Among the several objects of the invention may be noted the provision of a fuel control for preventing damage to an internal-combustion engine due to extended operation at excessive temperatures; the provision of such a control which is particularly useful in conjunction with diesel truck engines; the provision of such a control which is relatively tamperproof; the provision of such a control which is fail-safe in operation; the provision of such a control which is highly reliable and long lasting in operation; and the provision of such a control which is simply and economically constructed and installed. Other objects and features will be in part apparent and in part pointed out hereinafter.

Briefly, a control of the present invention is adapted to prevent damage to an internal-combustion engine due to extended operation at excessive temperatures where the engine is of the type having a speed which varies according to flow of fuel thereto. The control comprises a fuel-limiting solenoid valve for controlling the flow of fuel to the engine, the valve having a fuel control plunger movable from a first position permitting unobstructed flow of fuel to the engine to a second position causing reduction of the flow of fuel to a preset reduced amount causing reduction in engine speed by an amount sufficient to reduce the operating temperature thereof. The solenoid valve includes a winding adapted when energized to maintain the plunger in said first position and when deenergized to permit movement of the plunger to said second position. The control further includes switch means connected in a circuit with said winding for controlling the energization thereof. This switch means is responsive to the operating temperature of the engine and is operative to cause deenergization of the valve winding when the operating temperature exceeds a preset level. In this way, the speed of the engine is protectively reduced to reduce the operating temperature thereof in response to excessive temperature. In a preferred embodiment, the control further comprises second switch means connected in said circuit with the winding for controlling the energization thereof. The second switch means is responsive to the pressure of lubricant for the engine and is operative to cause deenergization of the winding when the lubricant pressure falls below a preset level. Accordingly, the speed of the engine is also protectively reduced in response to reduced lubricant pressure.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
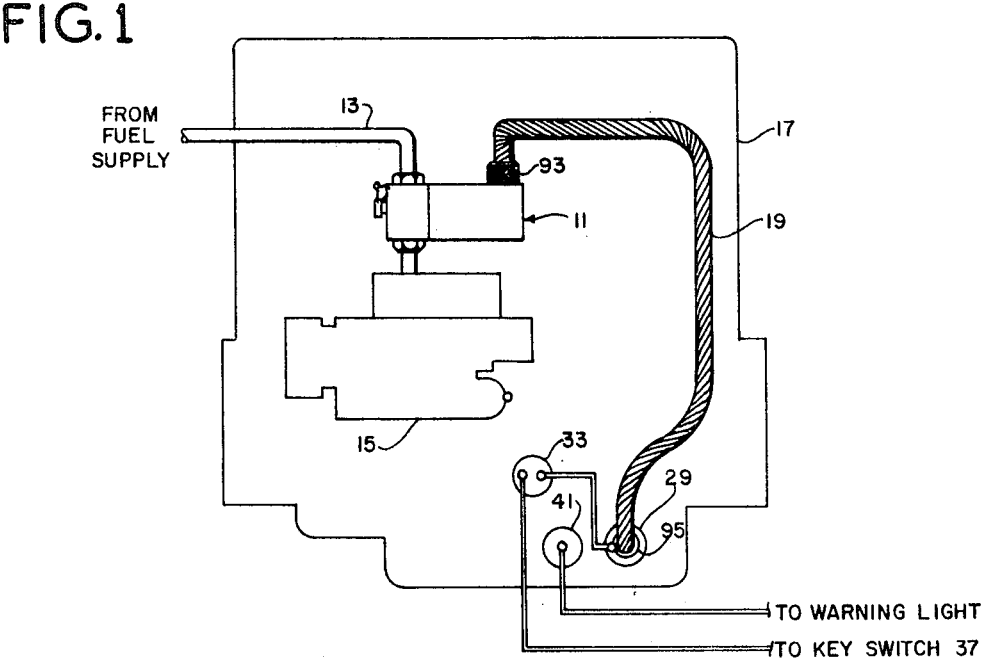
FIG. 1 is a pictorial illustration of a fuel control of the present invention shown for use with a diesel engine of the type employed in trucks.
Figure 2:
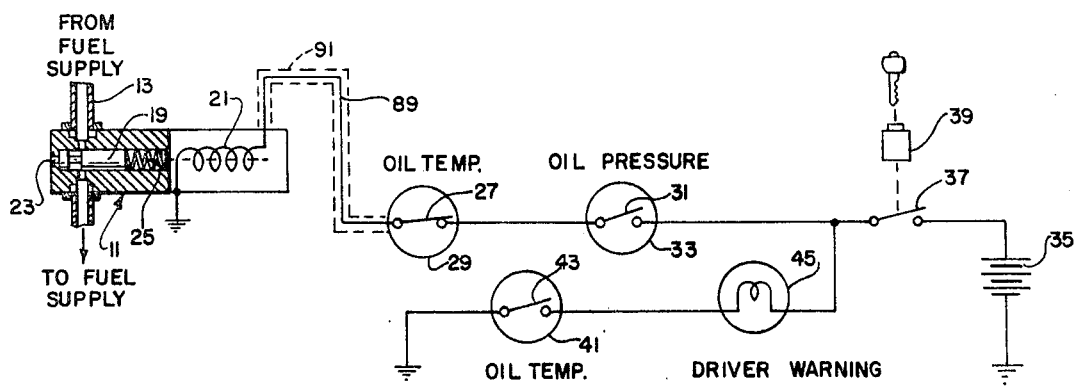
FIG. 2 is a schematic circuit diagram of the present control.

Referring now to the drawings, and more particularly to FIGS. 1 and 2, a fuel-limiting solenoid valve of the present invention, designated generally 11, is installed in the fuel input line 13 leading from a fuel supply tank to the fuel injection pump 15 of a diesel truck engine 17. Engine 17 is of the type of engine whose speed varies according to flow of fuel thereto. Thus the engine speed may be throttle controlled through operation of injection pump 15 by varying the amount of fuel delivered by the engine fuel injectors. As will be clear, however, the engine speed and thus the amount of power the engine can deliver may be reduced by restricting the flow of fuel delivered by line 13 by operation of solenoid valve 11.

Referring to FIG. 2, solenoid valve 11 includes a fuel control plunger 19 adapted to be operated by a solenoid winding 21. Plunger 19 is movable from a first position, permitting unobstructed flow of fuel to the engine fuel pump 15 through line 13 to a second position as illustrated. In this second position, plunger 19 causes reduction of the flow of fuel to a preset reduced amount determined by an adjusting screw 23. This reduced amount is predetermined to be sufficient to cause the engine power to diminish, thereby to reduce the operating temperature of engine 17 even if the truck driver should deliberately attempt to maintain full throttle operation, et cetera. Winding 21 is adapted when energized to maintain plunger 19 in the first position for unobstructed fuel flow and when deenergized to permit movement of plunger 19 under bias of a compression spring 25 to the second position.

Connected in a series circuit to one side of winding 21, the other side of which is grounded, are the normally closed contacts 27 of an oil temperature switch 29, and the normally open contacts 31 of an oil pressure switch 33. This series circuit is adapted to be connected to the "hot" side of a power source constituted by the usual truck storage battery 35 by the closing of one set of contacts 37 of the usual key-operated main or master switch 39 of the truck, which is manually operated to close contacts 37 for normal operation of the truck.

Both oil temperature switch 29 and oil pressure switch 33 may be physically mounted on engine 17 and connected to the so-called oil gallery thereof. Oil temperature switch 29 constitutes switch means responsive to the engine operating temperature, and contacts 29 thereof are adapted to open, thereby deenergizing winding 21, when the engine temperature exceeds a preset level, e.g., an oil temperature of 235° F. Oil pressure switch 33 constitutes switch means responsive to the engine oil pressure, and contacts 31 thereof are adapted to remain open for oil pressures below a preset level, e.g., 15 p.s.i., but to close at or above that level.

From the foregoing it will be seen that so long as the oil temperature is below the operating value for switch 29, i.e., 235° F., and the oil pressure is above the operating value for switch 33, a circuit for energizing winding 21 will be completed, assuming key switch contacts 37 are closed, from battery 35, through contacts 37, through contacts 27 and 31, and winding 21. Plunger 19 thus will be maintained in the first position providing unobstructed fuel flow for normal engine operation.

However, heating of the engine to the preset value, e.g., of 235° F., will open contacts 27 and thereby deenergize winding 21. Alternatively, a reduction in lubricant pressure, e.g., to less than the preset level of 15 p.s.i., will open contacts 31 and deenergize winding 21. Such an oil pressure reduction may be caused, for example, either by excessive oil temperature or some other failure in the oil system, such as insufficient oil. In any case, operation of either oil temperature switch 29 or oil pressure switch 33 will cause plunger 19 to restrict the flow of fuel and thereby protectively reduce the speed of the engine, so as to reduce its operating temperature.

It will be noted that upon startup of the engine, oil pressure is not developed until the engine attains normal running speed. Hence, contacts 31 of oil pressure switch 33 remain open until running speed is attained. Accordingly, at engine startup, plunger 19 is in the fuel flow-reducing position. However, this does not prevent the engine from being started since less fuel is required for starting than running. Moreover, this is advantageous in preventing the engine from being overspeeded prior to buildup of adequate lubricant pressure. That is, fuel flow will be limited until contacts 31 of the oil pressure switch close. Of course, a bypass switch could be connected across contacts 31, if desired, for use in starting the engine.

A driver-warning provision of the present invention includes a further oil temperature switch 41 having a set of normally open contacts 43 which are connected with a conventional signal or warning light 45 in series circuit between ground and the junction of switch contacts 37 with pressure switch contacts 31. Signal light 45 is positioned for being observed by the truckdriver. Oil temperature switch 41 is selected to have an operating temperature, at which contacts 43 thereof are adapted to close, which is a few degrees less than the operating temperature of temperature switch 29. For example, contacts 43 may close at about 225° F. It has been found that if the operating temperature of the truck engine starts to become excessive, there will be a short time lag, of about a minute, for example, before the temperature can climb the last few degrees (i.e., 10° F. in this case). Accordingly, signal light 45 will be energized to signal the driver that the temperature has exceeded 225° F. (i.e., the present operating temperature of switch 41). The driver will then have warning that, if the engine continues to be operated with too much throttle, etc., solenoid valve 11 will shortly be operated by switch 29 to cause an engine-speed reduction. So warned, the driver may reduce speed or shift to a lower gear and thus avoid a fuel reduction. As will be seen, operation of key switch 39 is also adapted to connect this warning circuit to battery 35 for normal operation.

Figure 3:
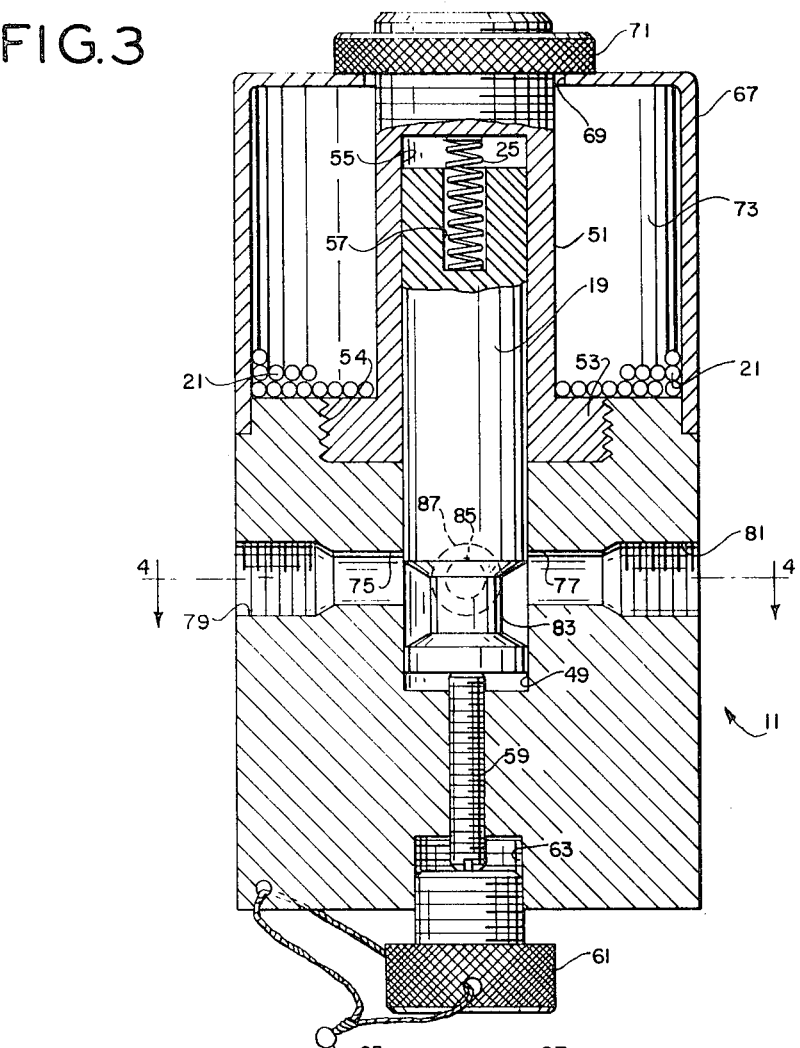
FIG. 3 is a vertical cross section of a fuel-limiting solenoid valve of the present control.
Figure 4:
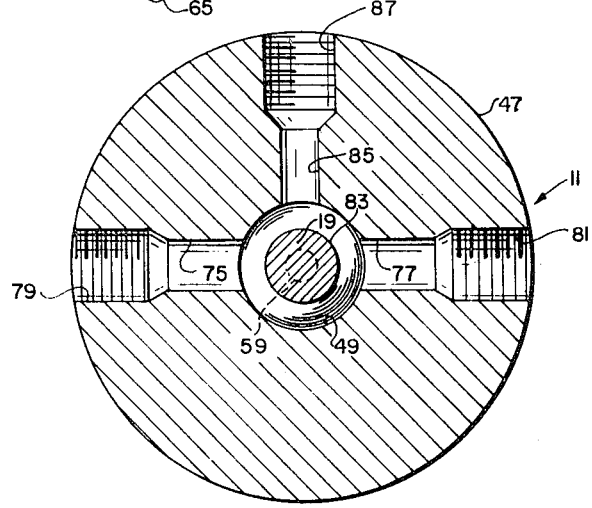
FIG. 4 is a horizontal cross section of the fuel-limiting solenoid valve taken along line 4—4 of FIG. 3.

Referring to FIGS. 3 and 4, fuel-limiting solenoid valve 11 is shown to comprise a cylindrical valve body or block 47 having a drilled concentric cylindrical bore 49 in which plunger 19, also cylindrical, is axially slidable between its aforesaid first and second positions. Plunger 19 is shown in its second position. A cylindrical sleeve 51 includes an annular flange 53 threaded into a concentric recess 54 at the top of body 47 and extends upward from body 47. Sleeve 51 also includes a drilled tubular concentric recess 55 providing an extension of bore 49. Compression spring 25 is fitted into a tubular concentric recess 57 at the upper end of plunger 19 and bears against the ends of recesses 55 and 57 for biasing plunger 19 for downward movement which is limited by a setscrew 59 screwed into block 47. Setscrew 59 bears against the lower surface of plunger 19 when the latter is in the fuel-limiting second position shown. A locknut 61 is screwed into a tapped recess 63 for locking setscrew 59 in position. Lock nut 61 may be safety wired in position and a seal 65 applied to the safety wire. A truck driver or other person is thus prevented from tampering with setscrew 59, a broken wire or seal being evidence of such tampering.

A thin, cylindrical metal cap 67 is fitted over the upper end of block 47. The upper end of sleeve 51 is threaded and extends through an aperture 69 in the top of cap 67. A knurled, threaded collar 71 is screwed onto this threaded portion of sleeve 51 to secure cap 67. Winding 21 is axially wound in the annular space 73 between sleeve 51 and cap 67.

Valve block 47 includes a fuel inlet port 75 and a fuel outlet port 77 both communicating with bore 49. Fuel outlet port 77 is substantially in registry with fuel inlet port 75. It will be understood that fuel line 13 is connected to inlet port 75 and outlet port 75 is connected by a short fuel line to fuel pump 15, each by suitable compression fittings screwed into respective drilled recesses 79 and 81. Plunger 19 is provided with an annular groove 83. When plunger 19 is in its first position for unobstructed fuel flow, i.e., is magnetically attracted to its uppermost position within bore 49 (as viewed in FIG. 3) by winding 21, groove 83 is aligned generally with fuel inlet and fuel outlet ports 75 and 77. However, in its second position (illustrated) with winding 21 deenergized, plunger 19 moves against setscrew 59 so that groove 83 is moved out of alignment with inlet and outlet ports 75 and 77 by a preset distance determined by setscrew 59, thereby causing reduced fuel flow between these inlet and outlet ports. Thus setscrew 59 provides means for adjustably limiting movement of plunger 19.

A fuel pressure test port 85 of smaller diameter than ports 75 and 77 but in registry with the latter ports may also be provided as illustrated to permit a pressure gauge to be connected at a threaded recess 87. This permits precise calibration of the position of plunger 19 by adjustment of setscrew 59. Recess 87 may be plugged after calibration with a nipple.

It should be observed that a control of the present invention is substantially fail-safe. If any of the components fail or power from the battery is interrupted (as by a driver's intentional cutting of the leads), winding 21 of solenoid valve 11 will be deenergized, causing plunger 19 to move to its fuel-limiting position.

In order to provide even greater assurance against unauthorized tampering with the circuit, the circuit lead, designated 89 in FIG. 2, extending from oil temperature switch 29 and connecting its contacts 27 to winding 21, is provided with a shield 91. Shield 91 may comprise metal tubing or suitable braided or armored flexible tubing. Shield 91 prevents tampering not only by making it difficult to gain access to lead 89, but also by giving the appearance of an oil line or the like. This causes the driver or other would-be tamperer to believe that cutting or removing the shield would release oil, et cetera. This oil line appearance may be enhanced by employing compression-type or knurled fittings 93 and 95 at the ends of shield 91.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A control for preventing damage to an internal-combustion engine due to extended operation at excessive temperatures, said engine having a speed which varies according to flow of fuel thereto, said control comprising:

a fuel-limiting solenoid valve for controlling the flow of fuel to said engine, said valve having a fuel control plunger movable from a first position permitting unobstructed flow of fuel to said engine to a second position causing reduction of the flow of fuel to a preset reduced amount causing reduction in engine speed by an amount sufficient to reduce the operating temperature thereof, said valve further including a winding adapted when energized to maintain said plunger in said first position and when deenergized to permit movement of said plunger to said second position; and first switch means connected in a circuit with said winding for controlling the energization thereof, said switch means being responsive to the operating temperature of the engine and operative to cause deenergization of said winding when the operating temperature exceeds a preset level whereby the speed of the engine is protectively reduced to reduce the operating temperature thereof in response to excessive temperature.

2. A fuel control as set forth in claim 1 further comprising second switch means connected in said circuit with said winding for controlling the energization thereof, said second switch means being responsive to the pressure of lubricant for the engine and operative to cause deenergization of said winding when the lubricant pressure falls below a preset level whereby the speed of the engine is also protectively reduced in response to reduced lubricant pressure.

3. A fuel control as set forth in claim 1 wherein said plunger is biased for movement from said first position toward said second position.

4. A fuel control as set forth in claim 1 wherein said plunger is cylindrical, said valve further including a cylindrical bore in which said plunger is axially slidable between said first and second positions, a fuel inlet port communicating with said bore, a fuel outlet port communicating with said bore and substantially in registry with said inlet port, said plunger having an annular groove aligned generally with said inlet and outlet ports when said plunger is in said first position and which is moved out of alignment by a preset distance to cause said reduction in the flow of fuel to said engine when said plunger is moved to said second position.

5. A fuel control as set forth in claim 4 wherein said valve further includes means for adjustably limiting movement of said plunger to establish said preset distance.

6. A fuel control as set forth in claim 1 wherein first switch means includes a normally closed set of contacts connected in series with said winding and adapted to open when the operating temperature exceeds the preset temperature valve, and said second switch means includes a normally open set of contacts also connected in series with said winding and adapted to be closed by lubricant pressure above the preset pressure valve.

7. A fuel control as set forth in claim 6 wherein a circuit lead extends from the set of contacts of said first switch to said winding and further comprising means for shielding said circuit lead thereby to prevent tampering therewith.

8. A fuel control as set forth in claim 1 further comprising signal means and further switch means connected in a further circuit with said signal means, said further switch means being responsive to the operating temperature of said engine and being operative to cause signalling operation of said signal means when the operating temperature exceeds a further preset level less than the preset level causing operation of said first switch means, thereby to give warning prior to engine speed reduction resulting from operation of said first switch means.

9. A fuel control as set forth in claim 8 wherein said signal means comprises a warning light and said third switch means includes a normally open set of contacts connected in series with said warning light and adapted to close for energizing said light when the operating temperature exceeds said further preset level.

10. A fuel control as set forth in claim 8 further comprising manually operable switch means for connecting a power source in the circuit with said winding and in said further circuit with said signal means.

* * * * *